Aug. 7, 1956     A. H. EBERHART     2,757,942
PIPE JOINT WITH SPRING DETENT AND RELEASING MEANS
Filed March 13, 1953     2 Sheets-Sheet 1

INVENTOR
ARTHUR H. EBERHART

BY *R. J. Eisinger*
ATTORNEY

INVENTOR
ARTHUR H. EBERHART
BY W. J. Eisinger
ATTORNEY

2,757,942

PIPE JOINT WITH SPRING DETENT AND RELEASING MEANS

Arthur H. Eberhart, East Longmeadow, Mass., assignor to Westinghouse Electric Corporation, East Pittsburgh, Pa., a corporation of Pennsylvania Application March 13, 1953, Serial No. 342,088

5 Claims. (Cl. 285—7)

This invention relates to a detachable hose coupling, more particularly to a coupling for attaching a hose to a vacuum cleaner or the like in which the coupling parts are rotatable relative to each other.

Vacuum cleaners, especially those of the tank type, are provided with attachment nozzles and brushes which are connected to the cleaner by an air conveying hose attachable to the fan chamber. It is desirable to provide a hose coupling which is readily attachable to and detachable from the cleaner and which is freely rotatable, whereby twisting of the hose is eliminated.

It is an object of the invention to provide a detachable hose coupling of the above type which is relatively simple and easy to manufacture and which is readily rotatable in response to a small twisting force imposed on the hose.

It is a further object to provide a hose coupling of the above type in which both the male and the female tubular elements are free of any sharp external projections.

These and other objects are effected by the invention as will be apparent from the following description taken in connection with the accompanying drawings, forming a part of this application, in which.

Figures 1, 2:
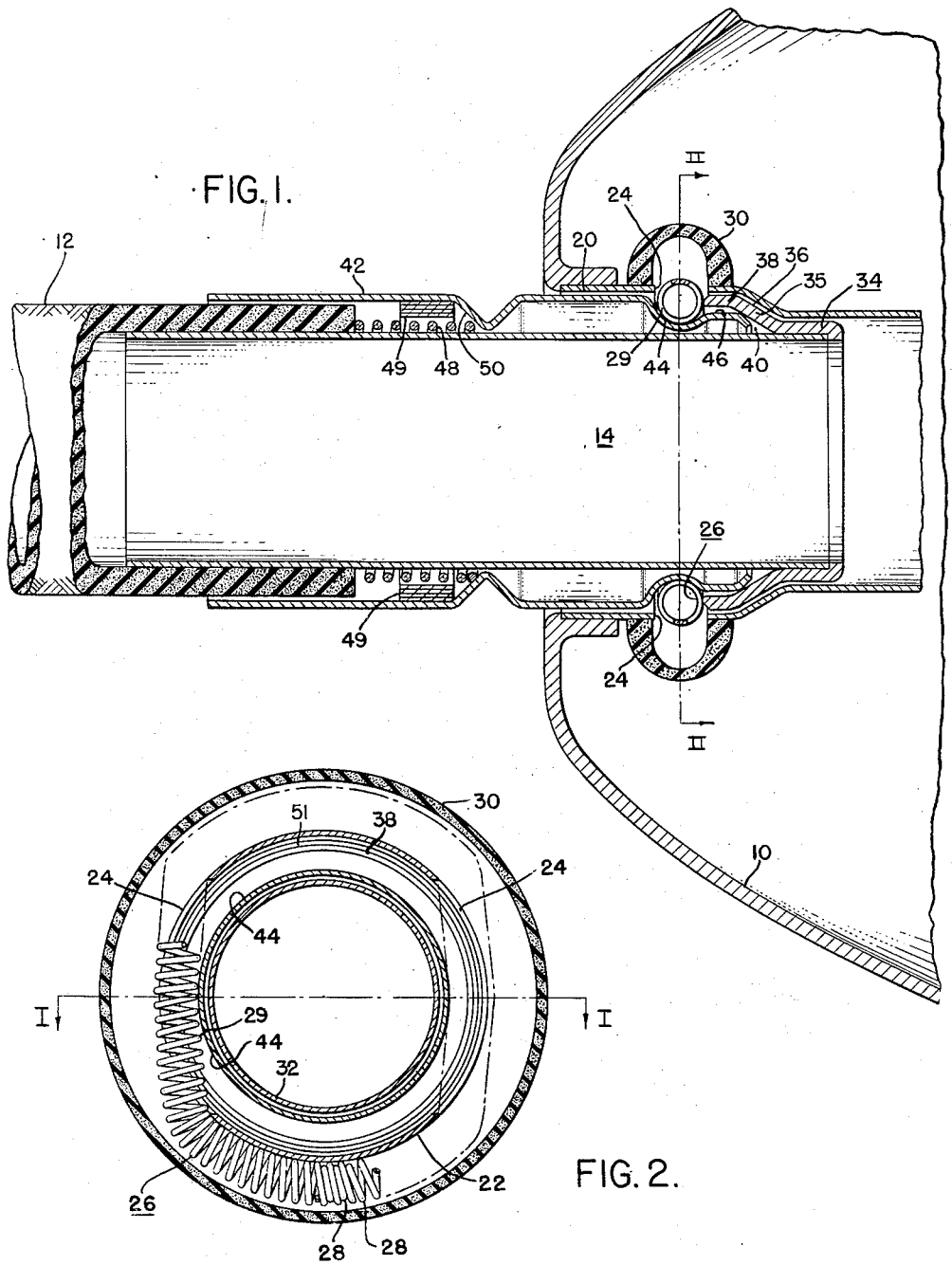
Fig. 1 is a longitudinal sectional view taken on line I—I of Fig. 2 and showing my improved hose coupling incorporated in a vacuum cleaner, the coupling elements being shown in connected relation and fragmentary portions of the hose and cleaner housing being shown.
Fig. 2 is a cross-sectional view taken on line II—II of Fig. 1.

Referring to the drawings in detail, especially Fig. 1, there is shown a portion of a vacuum cleaner housing 10 having a flexible hose 12 connected thereto by means of a detachable coupling, generally designated 14. As well understood in the art, air is drawn through the housing 10 by fan means (not shown), thereby providing suction at one end of the housing and pressure at the other end. The detachable coupling 14 and the hose 12 serve to connect the housing to a nozzle or the like (not shown) connected at the other end of the hose, thereby providing either suction or air pressure at the nozzle, dependent upon whether the coupling is connected to the suction end or the pressure end of the housing, respectively.

Figure 5:
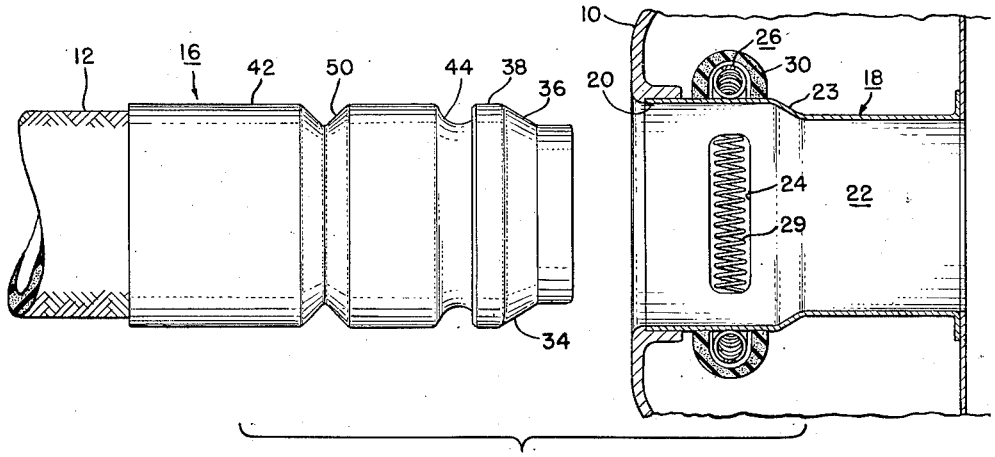
Fig. 5 is a view showing the male tubular element in elevation and detached from the female tubular element, the latter being shown in section for clarity.

The detachable coupling 14, as best shown in Fig. 5, comprises a tubular male element 16 connected to the flexible hose 12, and a tubular female element 18 having one end received in a cylindrical bore 20 provided in the cleaner housing 10.

The female element 18 has a tubular wall member 22 having a frusto-conical portion 23 and a pair of oppositely disposed slotted openings 24 disposed normal to the axis of the tubular wall. A resilient member, preferably a helically wound spring 26 having its ends 28 threaded into each other to form a closed loop or "garter," as shown in Fig. 2, embraces the tubular wall 22 adjacent the openings 24 and is disposed partly in the openings, as indicated at 29. The spring 26 is provided with sufficient tension to ensure that the portions 29 of the spring which are received within the openings 24 extend inwardly of the openings in substantially chordal fashion to form a barrier which may be deflected in a direction normal to the axis of the tubular wall 22.

A rubber ring member 30 having a U-shaped cross section is disposed about the "garter" spring 26 and is of sufficient width to seal the openings 24 and permit unimpeded radial movement of the spring.

Figure 3:
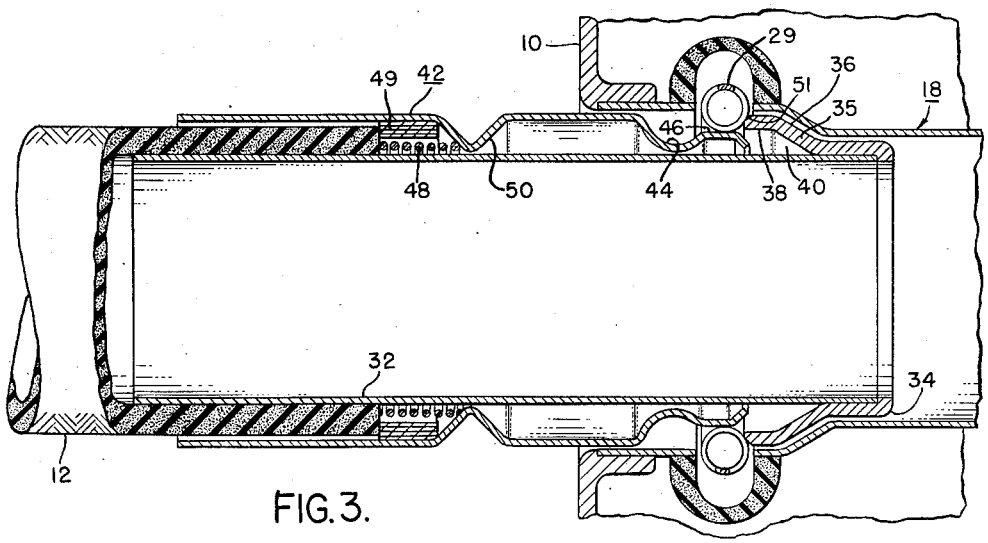
Fig. 3 is a view similar to Fig. 1 but showing the first stage of unlatching of the coupling.

The male element 16 comprises a tube 32 fixedly received in the hose 12 and having a portion extending beyond the end thereof. An annular cam member 34 formed of sheet material is rigidly attached to the free end of the tube 32 and is provided with a frusto-conical portion 35 having an outer cam surface 36 and a cylindrical portion 38. The frusto-conical portion 35 is of such dimensions that it nests with the frusto-conical portion 23 of the tubular wall 28, as shown in Figs. 1 and 3, and serves to limit the extent of insertion of the male element within the female element. The frusto-conical portion 35 and the portion 38 further serve, together with the tube 32, to define an annular space 40.

An elongated sleeve 42 is slidably received on the tube 32 and is provided on its outer surface with an annular recess 44 and a raised annular portion 46. The sleeve 42 is biased to the right, as seen in Figs. 1 and 3, by a helically wound spring 48 disposed in compression between the end of the hose 12 and a reduced portion 50 on the sleeve 42. When the sleeve 42 is in the locking position shown in Fig. 1, the raised portion 46 is nested within the annular space 40 provided by the cam member 34 and is biased into telescoping engagement with the cam member. The recess 44 is thus positioned in registry with the spring portions 29. The sleeve 42 is movable to the left, against the spring bias, a distance limited by the spacing between the end of the hose 12 and an annular abutment member 49 carried on the inner surface of the sleeve.

Operation

To connect the coupling, the male element 16 is inserted in the female element 18 and moved axially to the right, as seen in the figures, until further movement is prevented by abutment of the cam surface 36 with the frusto-conical portion 23 of the tubular wall. During insertion, the cam surface 36 contacts and deflects the spring portions 29 radially outwardly an amount sufficient to permit such insertion. The cylindrical portion 38 of the cam member 34 also slides past the spring portions and maintains them in distended position during the latter part of the insertion. When the male element is fully inserted, as seen in Fig. 1, the spring portions 29 are free to return to their original position, in which position they are in substantially tangential contact with the annular recess 44 of the sleeve 42. The rear edge of the portion 38 is in abutment with some of the coils of the spring portions 29 and prevents withdrawal of the male element.

The latching action of the spring portions 29 is positive and there is no danger of the coupling being unlatched by strains imposed on the coupling, as by a pulling force (to the left as viewed in Fig. 1) exerted on the hose 12 in the normal operation of the vacuum cleaner. Such strains are transmitted in axial direction to the spring portions 29 from the hose 12 through the tube 32 and the cam member 34 and move the spring portions into abutment with the left side of the openings 24.

The coupling is also free to turn in response to a twisting force exerted on the hose, since the rear edge of the cylindrical portion 38, which is in contact with the curved surfaces of the spring portions 29, is annular and rides smoothly thereon without binding or seizing.

Figure 4:
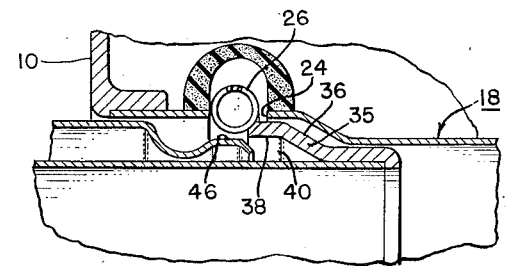
Fig. 4 is a fragmentary view similar to Fig. 1 but showing the second stage of unlatching of the coupling.

To detach the hose 12 from the vacuum cleaner, the male element is disconnected from the female element, in one motion, by grasping the sleeve 42 and pulling it to the left against the bias of the spring 48, as viewed in Fig. 3. It will be noted that the travel of the sleeve relative to the hose 12 is terminated when the annular member 49 strikes the end of the hose 12. During such relative movement, the recess 44 is moved to the left and the raised portion 46 is brought into engagement with the spring portions 29, as illustrated in Fig. 3, deflecting the latter radially outwardly toward the openings 24. The entire male element 16 then moves to the left together with the hose 12. During this latter movement, the rear edge of the cylindrical portion 38 is urged against the arcuate surface of the spring, deflecting the latter outwardly, as shown in Fig. 4. The cylindrical portion 38 then passes under the spring to free the male element from the female element.

The rear edge of the cylindrical portion 38 may be provided with a chamfered portion 51, if desired, to permit a smoother unlatching action. However, this feature is not essential, especially when the outer diameter of the cylindrical portion 38 is smaller than shown, with relation to the other parts.

In the embodiment shown and described above, two diametrically opposite chordal spring portions 29 are provided. When these portions are so arranged, they serve to prevent accidental unlatching even though the male element is loosely fitted to the female element. However, it is to be understood that the number of chordal spring portions 29 and mating openings 24 is not critical and may be varied as desired. Also, although a single spring of the loop or "garter" type is shown, obviously a separate spring may be provided for each opening.

It will now be seen that I have provided a detachable coupling in which the latching is automatically effected merely by insertion of the male element within the female element. It will also be seen that detachment of the male element is effected by a single pulling movement of the hand. That is, to detach the male element from the female element, it is merely necessary to grasp the sleeve 42 and pull outwardly, in the direction of disengagement, whereby the coupling is unlatched and the male element is withdrawn from the female element.

In addition to the above, it will be noted, as best shown in Fig. 5, that the male element presents a smooth surface devoid of sharp edges which may catch on apparel and the like when detached from the housing.

It will also be noted that the coupling is fully and smoothly rotatable about its longitudinal axis, this end being attained by the provision of the annular recess 44, which is in contact with the spring portions 29 during engagement of the two elements. The latching provided by the spring is of such nature that binding is eliminated, since the spring presents smooth curved abutment surfaces and the recess 44 and the rear edge of portion 38 present curved cooperating surfaces during engagement of the two elements.

While the invention has been shown in but one form, it will be obvious to those skilled in the art that it is not so limited, but is susceptible of various changes and modifications without departing from the spirit thereof.

What I claim is:

1. A detachable coupling comprising a female element having a tubular wall, a male element receivable in said female element, means for automatically latching said elements together comprising a resilient member supported by said tubular wall and having a latching portion which, in its normal position, projects inwardly therefrom, said male element comprising a tube having a cam outer surface portion for displacing said latching portion from its normal position during insertion of said male element in said female element, and an abutment surface which is disposed adjacent said latching portion after displacement, by the cam outer surface portion, of the latching portion from its normal position and its return to normal position, said abutment surface and the tubular wall of the female element abutting said latching portion in opposed, generally axial directions to prevent retraction of said male element when the two elements are in engagement, and means for disengaging said latching means comprising a sleeve disposed on and axially slidable on said male element and having a raised portion which is normally positioned on the side of said latching portion adjacent said cam member and radially inwardly of the outermost portion of said abutment surface, and said raised portion being movable axially relative to said latching portion and being effective upon such axial movement of the sleeve in retractive direction to displace said latching portion to permit disengagement of said abutment surface from said latching portion and thereby retraction of said male element from said female element.

2. A detachable coupling comprising a female element having a tubular wall, a male element being receivable in said female element, means for automatically latching said elements together, said latching means comprising a latching member resiliently supported by said tubular wall and projecting inwardly therefrom, said male element comprising a tube and an annular cam member surrounding said tube and in fixed relation therewith, said cam member having an annular cam surface for displacing said latching member during insertion of said male element in said female element and an abutment surface disposed radially outward of the outer surface of the adjacent portion of the male element for abutting said latching member in the direction of retractive movement of said male element, parallel to the axis thereof, when the two elements are in engagement, whereby said two elements are latched together, and means for disengaging said latching means comprising a sleeve slidably disposed on said male element, said sleeve having an annular recess for receiving said latching member and a raised annular portion positioned on the side of said latching member adjacent said cam and radially inward of said abutment surface for moving said latching member toward said tubular wall, and said raised portion being effective to move said latching member to a position permitting disengagement of said male element from said female element upon retractive movement of the sleeve.

3. A detachable coupling comprising a female element, a male element being receivable in said female element, means for automatically latching said elements together, said female member having a tubular wall provided with an opening and said latching means comprising an elongated resilient member supported in said opening and projecting inwardly therefrom, said resilient member being disposed transversely to the axis of said tubular wall, said male element comprising a tube and a tubular cam member surrounding said tube and in fixed relation therewith, said cam member having a cam surface for deflecting said resilient member to permit entry of said male element in said female element and an abutment surface disposed radially outward of the outer surface of the adjacent portion of the male element for abutting said resilient member in the direction of retractive movement of the male element, parallel to the axis thereof, to retain said elements in engagement, and means for disengaging said latching means comprising a sleeve slidably disposed on said male element, said sleeve having a raised annular portion positioned on the side of said resilient member adjacent said cam and radially inward of said abutment surface, and said raised portion being effective to deflect said resilient member upon retractive movement of the sleeve.

4. The structure recited in claim 3 in which said opening in said wall is elongated in a direction transverse to the axis of said tubular wall, and said resilient member comprises a helically wound wire tension spring extending the length of said opening and at least partially disposed therein.

5. A detachable coupling comprising a female element having a tubular wall, a male element telescopically receivable within the tubular wall of said female element, said tubular wall having a tapered portion for limiting the depth of insertion of said male member, means for automatically latching said elements together, said latching means comprising a helically wound wire spring embracing said tubular wall and distended thereby, said tubular wall having an opening and a portion of said spring being disposed in said opening at least partly within the confines of said tubular wall, said male element having an annular cam member for deflecting said spring to permit insertion of said male element in said female element, said cam member being further provided with an abutment surface disposed radially outward of the surface of the adjacent portion of the male element for engaging said spring in the direction of retractive movement of the male element, parallel to the axis thereof, to lock said elements together when the two elements are in engagement and defining an annular space with the male element, a sleeve slidably mounted on said male element for unlatching said elements, said sleeve receiving the resilient member when the two elements are in engagement and having an outwardly extending portion for engaging and deflecting said spring radially outward, resilient biasing means for positioning said outwardly extending portion in said annular space, said sleeve being retractable, relative to the male element, against said bias to position said outwardly extending portion against said spring to effect unlatching, and means to limit the retractive movement of the sleeve relative to the male element, said sleeve being thereby effective to retract the male element on further retractive movement of the sleeve.

References Cited in the file of this patent
UNITED STATES PATENTS

| | | |
|---|---|---|
| 1,513,710 | Lewis | Oct. 28, 1924 |
| 1,527,383 | Solliday | Feb. 24, 1925 |
| 1,829,255 | Ballou | Oct. 27, 1931 |
| 2,111,956 | Baldwin | Mar. 22, 1938 |
| 2,127,086 | McGrath | Aug. 16, 1938 |